Figure 3:
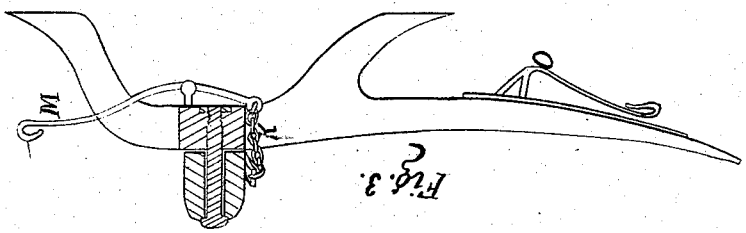

D. W. Johnson
Whiffletrees
No. 74,761      Patented Feb. 25, 1868

Witnesses.
J. C. Smith.
Al. Hughman.

Inventor.
Daniel W. Johnson.
Chipman Hosmer & Co.
Attys.

United States Patent Office.

DANIEL W. JOHNSON, OF BLOOMSBURG, PENNSYLVANIA.

Letters Patent No. 74,761, dated February 25, 1868.

IMPROVEMENT IN WHIFFLE-TREES.

The Schedule referred to in these Letters Patent and making part of the same.

TO WHOM IT MAY CONCERN:

Be it known that I, DANIEL W. JOHNSON, of Bloomsburg, in the county of Columbia, and State of Pennsylvania, have invented a new and valuable Improvement in Whiffle-Trees; and I do hereby declare that the following is a full, clear, and exact description of the construction and operation of the same, reference being had to the annexed drawings, making a part of this specification, and to the letters and figures of reference marked thereon.

The object of my invention is to provide better means than have heretofore been devised for detaching a horse from a carriage, when, in consequence of a runaway or other circumstances, it may be desirable to detach the horse instantaneously. To this end, I construct a whiffle-tree in the form shown in the drawings—

Figures 1, 2:
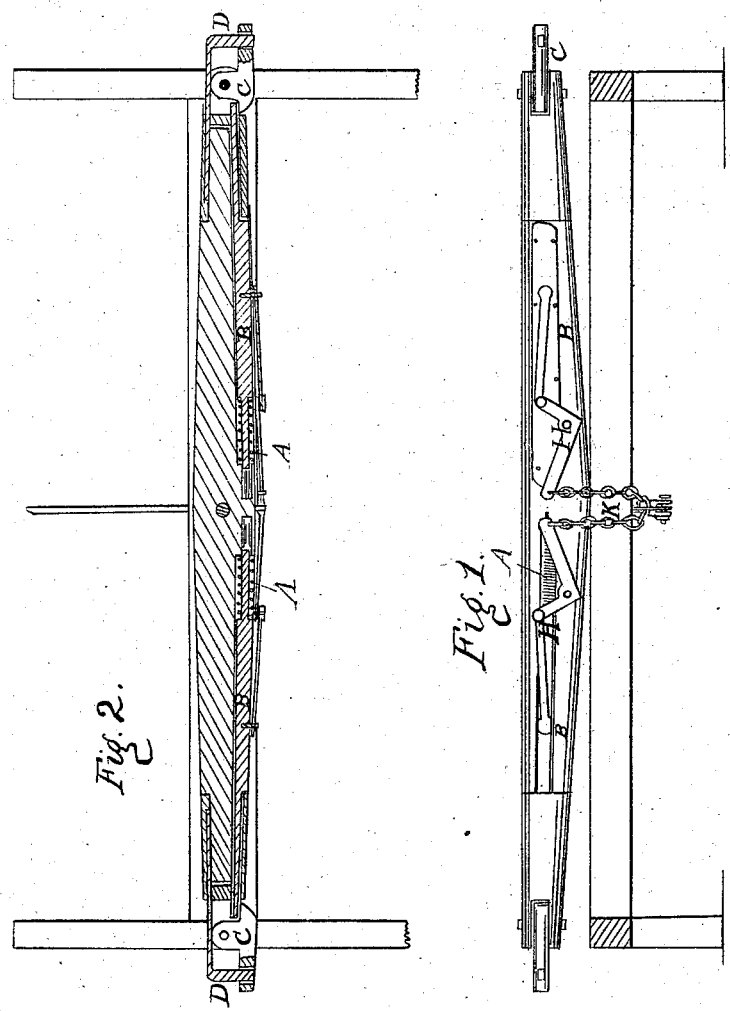

Figure 1 being a plan view, and
Figure 2 a sectional view thereof.

Letter A is a spiral spring, extending from near the centre of the whiffle-tree, outward, about six inches, more or less. Its inner end is attached to the whiffle-tree, as represented, and at its outer end it is connected with a slide, marked B. The slide B extends, from the point of its connection with spring A, to and under the lip of the button C, as shown on fig. 2. The button C is fastened to the whiffle-tree, near its end, by a bolt, on which it swings, the inner end thereof being constructed with a lip, as represented, and the outer end extending to and beyond the guard D. This button C is perforated near its outer end, and the perforation is adapted to and receives the point of guard D, as shown on fig. 2. Letter H represents a series of levers, constructed and connected in the form shown on fig. 1, the outer one of which is attached to the slide B. Letter K is a double chain, attached, in the manner represented, to the inside ends of the series of levers H. This chain K extends below the cross-bar of the carriage-shafts, on which the whiffle-tree is placed, where it is united with a lever marked M. Said lever M, and the method of its adjustment and connection with the chain, is shown on fig. 3 of the drawings. At the end of lever M, next the carriage, I attach a chain or wire, that leads into the body of the carriage. On the under side of the carriage-shaft I adjust lugs, in the form shown by letter O, on fig. 3. The forward parts of these lugs are made of thin metal, so as to allow them to spring downward with ease, and thereby offer no obstruction to the detaching process.

My device is operated as follows: Whenever, for any reason, it is deemed important to detach the horse from the carriage, the driver raises the chain or wire in the carriage, and pulls it upward with considerable force. This movement, operating through the levers, springs, and slide above mentioned, releases the slide from the lip of the button C. Now, as the tugs of the harness are held by button C, it follows that by releasing the slide from the lip of said button, the same swings forward, and the horse is free.

What I claim as my invention, and desire to secure by Letters Patent, is—

A whiffle-tree, having spring A, slide B, levers H and M, chains K, and button C, constructed, combined, and arranged substantially as specified.

DANIEL W. JOHNSON.

Witnesses:
B. F. KINNEY,
M. L. HAUSKNECHT.